March 22, 1949. H. COHEN 2,465,199
WINCH
Filed Feb. 7, 1945
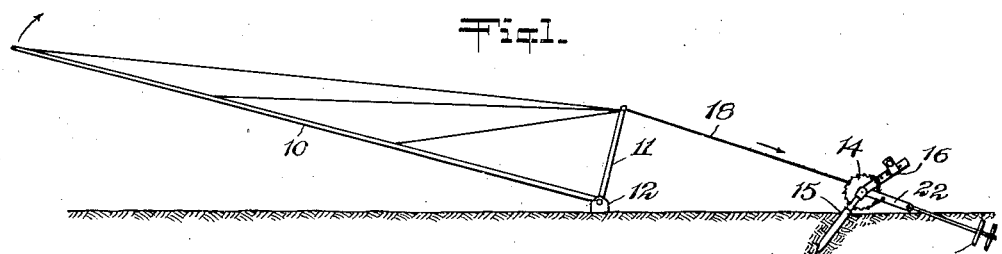
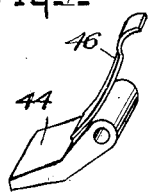
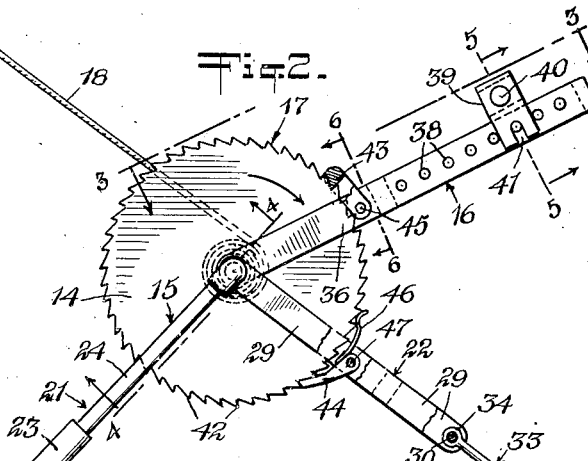
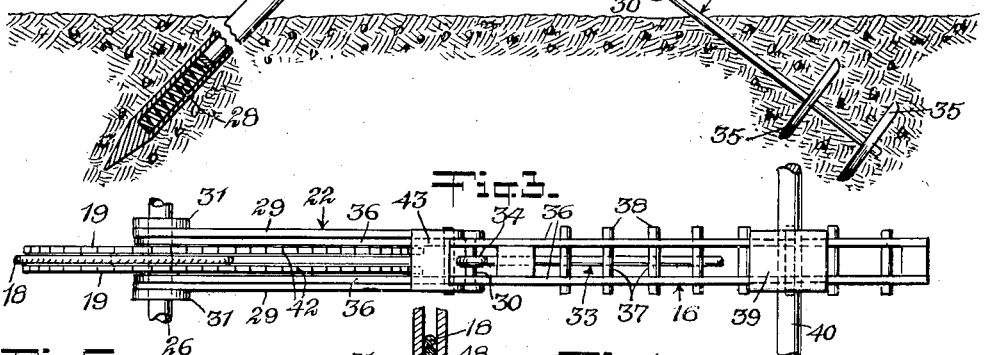
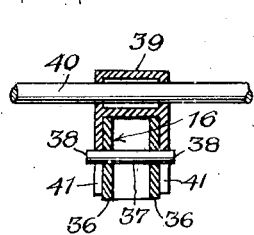
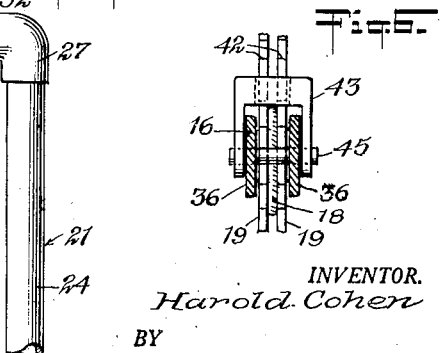
INVENTOR.
Harold Cohen
BY
Munn, Liddy & Glaccum
Attorneys Patented Mar. 22, 1949

2,465,199

UNITED STATES PATENT OFFICE 2,465,199

WINCH

Harold Cohen, Elizabeth, N. J.

Application February 7, 1945, Serial No. 576,562

5 Claims. (Cl. 254—186)

This invention relates to a winch or crab and has especial reference to a device of such type which may be used advantageously for raising a mast or the like from a horizontal position on the ground to a vertical or upright position.

The principal object of the invention is the provision of a device of the indicated character embodying improvements whereby to attain a more effectual application of the power effort and greater facility in raising or swinging a structure such as a mast from one position to another.

Another object of the invention is the provision of a winch which is self-adjustable so that the cable reel will be disposed effectually according to changes in the direction of the power effort applied by the cable as it is being wound on the reel in raising or swinging a structure having pivotal movement.

A further object of the invention is the provision of a winch affording mechanical advantages in the application of power, and one whose parts may be quickly and easily assembled and disassembled, and which is of substantial and efficient design.

The nature of the invention and its distinguishing features and advantages will appear when the following specification is read in connection with the accompanying drawing, in which—

Fig. 1 is a side elevational view of winch embodying the features of the invention in use for the purpose of raising a mast.

Fig. 2 is a side view of the winch on an enlarged scale, portions of the winch being shown in section.

Fig. 3 is a top plan view as indicated by the line 3—3 of Fig. 2.

Fig. 4 is sectional view taken on the line 4—4 of Fig. 2.

Fig. 5 is a sectional view taken on the line 5—5 of Fig. 2.

Fig. 6 is a sectional view taken on the line 6—6 of Fig. 2.

Fig. 7 is a perspective view of one of the ratchet pawls.

Referring now to Fig. 1, it will be apparent there is shown in a conventional manner, a mast 10 having a boom 11 on the lower end and extending at a right angle with respect thereto. The mast 10 has a pivotal connection with a base 12 which is anchored to the ground.

The winch of the present invention comprises a reel 14 which is mounted for rotation on a self-adjustable supporting and anchoring structure 15, the reel 14 being given motion by a manually operable lever 16 through the intervention of a ratchet 17.

The reel 14 is one which is of one strand width so as to wind a cable 18 one convolution over another. This is done to obtain a large mechanical advantage of leverage at the beginning of the load raising operation and to exert a uniform force throughout the entire operation during which the motion is accelerated proportionately as the force required to raise the load diminishes.

The reel 14 consists of two disks 19 secured, as by welding, to a hub 20. The disks 19 are arranged in spaced parallel relation to each other. The space between the disks 19 is slightly greater than the cross-sectional size of the cable used for the purpose mentioned above.

The supporting and anchoring structure 15 consists of legs 21 and a leg 22. Each of the legs 21 is composed of sections 23 and 24, respectively. The sections are of suitable length and each is tubular. The sections 23 and 24 are arranged in telescoping relation, the section 24 being slidable in the section 23. Each leg 21 is, therefore, longitudinally adjustable as to length. The lower end of each section 23 has formed thereon a point 25 so that each leg 21 may penetrate the ground as shown. The upper ends of the sections 24 are connected by a section 26 and elbows 27. The legs 21 are disposed in spaced and parallel relation to each other. A helical compression spring 28 is arranged within each leg section 23 and acts on the inner end of the companion leg section 24. The springs 28 serve as a resilient or cushioning means for a purpose to be explained.

The section 26 serves as the shaft or axle of the reel 14 and is, therefore, of such cross-sectional size as to loosely fit in the hub 20.

The leg 22 is composed of elongated metal members 29, there being a short rod 30 connecting adjacent ends of the members 29, and the other adjacent ends of said members having alined holes to receive the shaft 26 with the members 29 abutting collars 31 secured to the shaft 26 by set screws 32. The leg 22 is thus pivotally connected with the shaft 26, and the reel 14 is disposed between its members 29. An anchor 33 has one end pivotally connected with the rod 30, as at 34. The anchor 33 has any suitable means, such as the mushroom disks 35 for interment in the ground as shown.

The lever 16 is composed of elongated metal members or bars 36 of any preferred length. The members 36 are connected in spaced parallel relation by equally spaced rods 37 welded or otherwise secured to the members 36. The rods 37 project to provide a series of fixed studs 38 on either side of the lever 16. A U-shape holder member 39 supports a handlebar 40 of suitable length disposed crosswise of the lever 16. The holder member 39 has alined slots 41 therein to receive a pair of the studs 38. The holder member 39 may be shifted into different positions of adjustment on the lever by reason of said studs 38. This enables more or less leverage or application of the power effort. The lever 16 is fulcrumed on the shaft 26.

The ratchet 17 consists of teeth 42 on the circumferential edge of each disk 19, and pawls 43 and 44, respectively. The pawl 43 is of U-shape and is pivotally connected with the lever 16, as at 45. The pawl 44 has a crimped leaf spring 46 welded thereto. The pawl 44 is pivotally connected with the leg 22 between the members 29, as at 47. Both pawls 43 and 44 cooperate with the teeth 42 of both disks 19. The crimped end of the spring 46 bears on the teeth 42 to retain the pawl 44 disposed to engage the teeth presented thereto in order to prevent retrograde rotation of the reel 14. In other words, the spring pressed pawl 44 serves as a detent. The pawl 43 is engageable with some of the teeth 42 to impart rotational movement to the reel 14 in response to the operation of the lever 16, when power is applied to the handle-bar 40.

The cable 18 has one end secured to the hub 20, as at 48. The other end of the cable 18 is adapted for connection for the application of the power effort. As shown in Fig. 1, the cable is connected with the outer end of the boom 11. The winch is positioned at a suitable distance from the base of the mast while the latter is lying lengthwise on the ground. The anchor 33 is grounded and the legs 21 are made to penetrate the ground, so that the legs 21 may be spread apart with respect to the leg 22. The holder member 39 is set in position at or near the outer end of the lever 16. The handle-bar 40 is manipulated by manpower to impart rotatory motion to the reel 14 through the intervention of the lever 16 and the ratchet 17. The cable 18, which is fully unwound at the beginning of the mast raising operation, will be wound on the hub 20. At the start of the operation, the winch will exert its greatest power effort when the load is heaviest, because the first convolution of the cable on the hub will be comparatively small. The mast 10 will be moved on its upward course during which the force required to raise the mast diminishes in approximately the same proportion as the reel 14 loses its initial mechanical power advantage. It is, therefore, possible to exert a uniform force throughout the entire raising operation and with an accelerated motion due to the gradual increase in the successive convolutions of the wound cable.

The springs 28 counter-balance the dead weight of the winch, so that the winch is always in a straight line between the top of the boom 11 and the anchor 33. The reel 14 adjusts itself according to changes in the direction of the power effort applied by the cable as it is being wound in the reel. The reel is up high enough at the start of the operation so that cable is at its greatest angle with respect to the surface of the ground. The reel may shift in a downward direction, thereby decreasing the angle of the cable as the boom 11 swings downwardly, with the result that the power effort or pulling force will be effectually directed. The winch remains anchored and the cable will be maintained in a straight line extending between the top of the boom and the anchor 33.

It will be apparent that the parts of the winch may be readily disassembled when not in use and the parts may be assembled when it is desired to use the winch.

I claim:

1. A winch comprising a reel, a length of cable having one end connected with said reel so that the cable may be wound on and unwound from the reel, a ground engaging structure on which said reel is mounted for rotation, and means operable to rotate said reel, said structure enabling the reel to adjust itself according to changes in direction of the power effort applied by the cable as it is being wound on the reel, said structure including movable legs composed of sections consisting of lower ground penetrating sections and upper sections, and resilient means interposed between the sections of each leg.

2. A winch comprising a reel, a length of cable having one end connected with said reel so that the cable may be wound on and unwound from the reel, a ground engaging structure on which said reel is mounted for rotation, and means operable to rotate said reel, said structure enabling the reel to adjust itself according to changes in direction of the power effort applied by the cable as it is being wound on the reel, said structure including pivoted legs composed of sections consisting of lower ground penetrating sections and upper sections respectively, and a helical compression spring interposed between the sections of each leg.

3. In a winch, a rotatable reel of single cable strand width, an axle on which the reel may rotate, resiliently telescopic ground engaging legs connected with the opposite ends respectively of said axle, a lever fulcrumed on said axle, and a ratchet operated by said lever to rotate said reel.

4. In a winch, a rotatable reel, an axle on which the reel may rotate, resiliently telescopic ground engaging legs connected with the opposite ends respectively of said axle, means connected with said axle cooperating with said legs to anchor the winch to the ground, a lever fulcrumed on said axle, and means operated by the lever to rotate said reel.

5. In a winch, a rotatable reel, an axle on which the reel may rotate, resiliently telescopic ground engaging legs connected with the opposite ends respectively of said axle, a third leg pivotally connected with said axle and having means on its lower end for anchoring the winch to the ground, a lever fulcrumed on said axle, ratchet means operated by said lever to rotate said reel in one direction, and a detent on said third leg coacting with the ratchet means to prevent retrograde rotation of the reel.

HAROLD COHEN.

REFERENCES CITED

The following references are of record in the file of this patent:

UNITED STATES PATENTS

| Number | Name | Date |
|---|---|---|
| Re. 6,105 | Harfield | Oct. 27, 1874 |
| 632,684 | Hooker | Sept. 5, 1899 |
| 1,287,050 | Kranz | Dec. 10, 1918 |
| 1,287,313 | Hoffland | Dec. 10, 1918 |
| 1,306,721 | Rose | June 17, 1919 |
| 1,806,606 | Booth | May 26, 1931 |